United States Patent [19]

Koike et al.

[11] 4,071,827
[45] Jan. 31, 1978

[54] TRANSVERSAL TYPE AUTOMATIC PHASE AND AMPLITUDE EQUALIZER

[75] Inventors: Shin'ichi Koike; Seijiro Hayashi; Michio Takayama, all of Tokyo, Japan

[73] Assignee: Nippon Electric Co., Ltd., Tokyo, Japan

[21] Appl. No.: 749,136

[22] Filed: Dec. 9, 1976

[30] Foreign Application Priority Data

Dec. 9, 1975 Japan ................................. 50-147154

[51] Int. Cl.² .............................................. H04B 1/12
[52] U.S. Cl. .......................................... 325/42; 333/18
[58] Field of Search ............................ 325/42; 333/18; 328/163, 56

[56] References Cited

U.S. PATENT DOCUMENTS

| | | | |
|---|---|---|---|
| 3,571,733 | 3/1971 | Fang | 328/56 |
| 3,781,720 | 12/1973 | Mueller | 325/42 |
| 3,868,603 | 2/1975 | Guidoux | 325/42 |
| 3,875,515 | 4/1975 | Stuart | 325/42 |
| 3,921,072 | 11/1975 | Sato | 325/42 |
| 3,992,616 | 11/1976 | Acker | 333/18 |
| 4,004,226 | 1/1977 | Qureshi | 333/18 |
| 4,027,258 | 5/1977 | Perreault | 333/18 |

OTHER PUBLICATIONS

"Principles of Data Communication" Lucky, et al. McGraw-Hill, pp. 45-51 and 158-165.

*Primary Examiner*—Robert L. Griffin
*Assistant Examiner*—Michael A. Masinick
*Attorney, Agent, or Firm*—Sughrue, Rothwell, Mion, Zinn and Macpeak

[57] ABSTRACT

A transversal type automatic equalizer includes circuits for differentiating the equalized signal, sampling the equalized signal under the control of a timing signal, and generating an error signal from the sampled signal. The differentiated and error signals are multiplied together and a variable phase shifter phase shifts the timing signal in response to their product to provide optimum equalization.

6 Claims, 7 Drawing Figures

FIG. 5

| CASE No. | CUT-OFF FREQUENCIES OF LOW-PASS FILTERS (MHz) | | | EQUALIZED PHASE (°) (FIG.3) | EQUALIZABLE RANGE (°) (FIG.3) | | | EQUALIZED PHASE (°) (FIG.2) |
|---|---|---|---|---|---|---|---|---|
| 0  | ∞    | ∞    | ∞    | 0   | -25 | ∼ | 59  | 32 |
| 1  | 1.13 | 1.13 | 1.13 | 0   | -25 | ∼ | 59  | 34 |
| 2  | .800 | .800 | .800 | 0   | -25 | ∼ | 63  | 34 |
| 3  | .566 | .566 | .566 | 19  | -6  | ∼ | 53  | 40 |
| 4  | .400 | .400 | .400 | 33  | 13  | ∼ | 71  | 65 |
| 5  | 1.13 | "    | .283 | 36  | 17  | ∼ | 59  | x |
| 6  | .800 | "    | "    | 59  | 36  | ∼ | 80  | x |
| 7  | .566 | "    | "    | 42  | 19  | ∼ | 65  | x |
| 8  | .400 | "    | "    | 53  | 23  | ∼ | 78  | x |
| 9  | ∞    | ∞    | "    | 38  | 13  | ∼ | 67  | x |
| 10 | ∞    | .283 | "    | 57  | 44  | ∼ | 75  | x |
| 11 | 4.53 | "    | "    | 57  | 44  | ∼ | 75  | x |
| 12 | 3.20 | "    | "    | 44  | 33  | ∼ | 59  | x |
| 13 | 2.26 | "    | "    | 42  | 33  | ∼ | 63  | x |
| 14 | 1.60 | "    | "    | 57  | 31  | ∼ | 78  | x |
| 15 | 1.13 | "    | "    | 71  | 34  | ∼ | 92  | x |
| 16 | .800 | "    | "    | 44  | 29  | ∼ | 63  | x |
| 17 | .566 | "    | "    | 57  | 40  | ∼ | 84  | x |
| 18 | .400 | "    | "    | 48  | 29  | ∼ | 63  | x |
| 19 | .283 | "    | "    | 101 | 82  | ∼ | 109 | x |

TRANSVERSAL TYPE AUTOMATIC PHASE AND AMPLITUDE EQUALIZER

BACKGROUND OF THE INVENTION

The present invention relates to an automatic phase and amplitude equalizer.

An outline of a multilevel signal or pulse amplitude modulation (PAM) signal transmission system including a transversal type of automatic equalizer in the prior art is shown in FIGS. 1 and 2. In FIG. 1, reference numeral 1 designates a roll-off filter whose transfer function is represented by $G(f)$. Reference numeral 2 designates a low-pass filter for removing undesired out-of-band signals, its transfer function being represented by $B(f)$. The filters 1 and 2 correspond to a transmission line for the multilevel signals. In addition, reference numeral 3 designates a phase synchronizer circuit which regenerates a timing signal (called "identifying timing signal") synchronized with the baud rate frequency $f_o$ of the multilevel (PAM) signal, by extracting from the input multilevel signal a pilot signal contained therein. The timing signal is used for operating the automatic equalizer to be detailed later.

An equivalent base band transfer function $X(f)$ for filters 1 and 2 in FIG. 1 is given by:

$$X(f) = G(f) \cdot B(f) \cdot e^{j\pi f \tau} \tag{1}$$

where $\tau$ represents an identifying timing point. When an impulse having an amplitude of unity is applied to the filter 1 as an input signal to the transmission line, the output response signal $x(t+\tau)$ can be obtained from an inverse Fourier transformation of the equivalent base band transfer function $X(f)$, so that it can be represented by the following function of time:

$$x(t+\tau) = F^{-1}[X(f)] \tag{2}$$

where $F^{-1}[X(f)]$ represents an inverse Fourier transformation.

Now an output response signal $x_n$ at identifying time points is given by $$x_n = x(nT+\tau) \tag{3}$$

where $n$ is an integer and T is a baud rate period $(1/f_o)$.

Here, it is assumed that said identifying timing point $\tau$ is normalized with respect to T and represented by a symbol, $$\xi = \tau/T \tag{4}$$

and this is called "an identifying timing phase" (also called "a timing phase"). Accordingly, Equation-(1) is represented as follows:

$$X(f) \, ( \, G(f) \cdot B(f) \cdot e^{j\pi f \xi T} \tag{5}$$

Next, a description will be given, made with reference to FIG. 2, of a principle of a transversal type of automatic equalizer for equalizing this $x(t+\tau)$. FIG. 2 and the phase synchronizer circuit 3 in FIG. 1 correspond to a receiving station. In FIG. 2, reference numeral 21 designates a tapped delay line having tap terminals at a time interval equal to the baud rate period T. Character $C_k$ represents a weight factor of a variable tap weighting circuit 22 $(k)$ provided for each tap, where character $k$ represents a tap number ($-N_t < k < N_t$ and the number of taps is $2N_t+1$). Numeral 23 designates a summing amplifier. The summing amplifier 23 sums the multilevel (PAM) signals controlled by the respective tap weighting circuits 22$(k)$, and provides an equalized multilevel (PAM) signal at its output terminal 231. The signal derived from the terminal 231 is fed to a sampler 25. In the sampler 25, the equalized multilevel (PAM) signal is sampled by means of an identifying timing signal fed from a phase shifter 30, and the sampled signal is fed to a slicer 26 and a subtracter 28. The slicer 26 delivers an identified signal of the sampled signal from the output terminal 27. The subtracter 28 compares the outputs of the sampler 25 and of the slicer 26 and generates an error signal corresponding to the difference between them. This error signal is fed to multipliers 24 $(k)$. A comparator 31 supplies a signal representative of the difference between the outputs of the variable tap weighting circuits 24 $(-i)$ and 24 $(i)$ to an integrator 29. The integrated output is supplied to a phase shifter 30 and serves as a control signal for controlling the phase of the regenerated identifying timing signal supplied from the terminal 32.

In the transversal type of automatic equalizer, the signal $x(t+\tau)$ to be equalized is passed through the delay line 21, and signals obtained at each tap at every time interval T are controlled in the variable weighting circuits 22 $(k)$ for each tap, a total sum of them being delivered as an output. The waveform equalization is thus accomplished by automatically controlling the weight factor $\{C_k\}$ in response to the output of each multipliers 24 $(k)$. In the multiplier 24 $(k)$, the multiplication of the error signal fed from the subtractor 28 and the multilevel (PAM) signal fed from each tap of the delay line 21 is accomplished. The output signals of the multipliers 24 $(k)$ serve as tap control signals for controlling the respective variable tap weighting circuits 22 $(k)$. By continuously carrying out the aforementioned operations in a closed loop, the phase of the identifying timing signal can be controlled so as to automatically accomplish optimum equalization.

The equalizer shown in FIG. 2, however, has a disadvantage in that the equalizable delay and attenuation ranges are narrow.

SUMMARY OF THE INVENTION

One object of the present invention is to provide an improved transversal type of automatic equalizer whose equalizable delay and attenuation ranges are comparatively wide.

In order to better understand the novel feature of the present invention, the theoretical principle of the present invention will be derived through mathematical analysis.

Generally, the equalized output signal $y(t)$ of this transversal type of automatic equalizer is given by $$y(t) = \sum_{k=-N_t}^{N_t} C_k \cdot x(t - kT) \tag{6}$$

The thus obtained output signal $y(t)$ has an error from its ideal value, and automatic control of this error towards its minimum value is carried out under the principle of the transversal type automatic equalizer. An error $e_n$ of an equalized output signal $y_n$ at the identifying time point $t = nT + \tau$ is defined as follows:

$$e_n = y_n - d_n \tag{7}$$

where $y_n$ is defined by, $$y_n = y(nT + \tau) \tag{8}$$

and $d_n$ represents the aforementioned ideal value.

A number of algorithms are known for controlling the tap weights of the automatic equalizer by means of the error $e_n$, but for the purpose of the following description, a method of minimizing a mean square error (hereinafter abbreviated as MSE) will be used as an example. An automatic equalizer employing this algorithm is often called "MSE type of automatic equalizer". Now the algorithm for the MSE type of automatic equalizer employs an evaluation function represented by the following equation:

$$\epsilon = \sum_{n=-\infty}^{\infty} e_n^2 \tag{9}$$

For compensation of $\xi$ and $\{C_k\}$ of the MSE type automatic equalizer, it is contemplated to use gradients of the respective quantities as follows:

$$\frac{\delta\epsilon}{\delta\xi} \alpha \sum_{n=-\infty}^{\infty} \frac{\delta e_n}{\delta \tau} \cdot e_n \tag{10}$$

Whereas, from equation (7), we have $$\frac{\delta e_n}{\delta \tau} = \frac{\delta y_n}{\delta \tau} = \frac{\delta}{\delta \tau} \{y(t)|_{t=nT+\tau}\} = \frac{\delta}{\delta t} y(t)|_{t=nT+\tau} = \dot{y}(t)|_{t=nT+\tau} = \dot{y}_n$$

Therefore, we have $$\frac{\delta\epsilon}{\delta\xi} \alpha \sum_{n=-\infty}^{\infty} \frac{\delta e_n}{\delta \tau} \cdot e_n = \sum_n \dot{y}_n \cdot e_n \tag{11}$$

Introducing $$\nabla\xi = \sum_{n=-\infty}^{\infty} \dot{y}_n \cdot e_n \tag{12}$$

and representing the value of $\xi$ at an identifying time point $t = lT + \tau$ by $\xi^{(l)}$, the $\xi$ is successively controlled as follows:

$$\xi^{(l+1)} = \xi^{(l)} - a_1 \nabla\xi \tag{13}$$

where $a_1$ is a constant, and $l$ is an integer.

Likewise, with regard to the control for each tap, the following equation is obtained:

$$\frac{\delta\epsilon}{\delta C_k} \alpha \sum_{n=-\infty}^{\infty} \frac{\delta e_n}{\delta C_k} \cdot e_n = \sum_{n=-\infty}^{\infty} x_{n-k} \cdot e_n \tag{14}$$

Introducing $$\nabla C_k = \sum_{n=-\infty}^{\infty} x_{n-k} \cdot e_n \tag{15}$$

the weight factor $C_k$ is controlled aas follows:

$$C_k^{(l+1)} = C_k^{(l)} - a_2 \nabla C_k \tag{16}$$

where $a_2$ is a constant, and $C_k^{(l)}$ is the value of $C_k$ at the identifying timing point $t = lT + \tau$.

BRIEF DESCRIPTION OF THE DRAWINGS

Now the present invention will be described in more detail in connection with its preferred embodiments illustrated in the accompanying drawings, in which;

FIG. 5 shows experimental data for the automatic equalizers according to the present invention and of prior art.

DESCRIPTION OF THE PREFERRED EMBODIMENT

Figure 2:
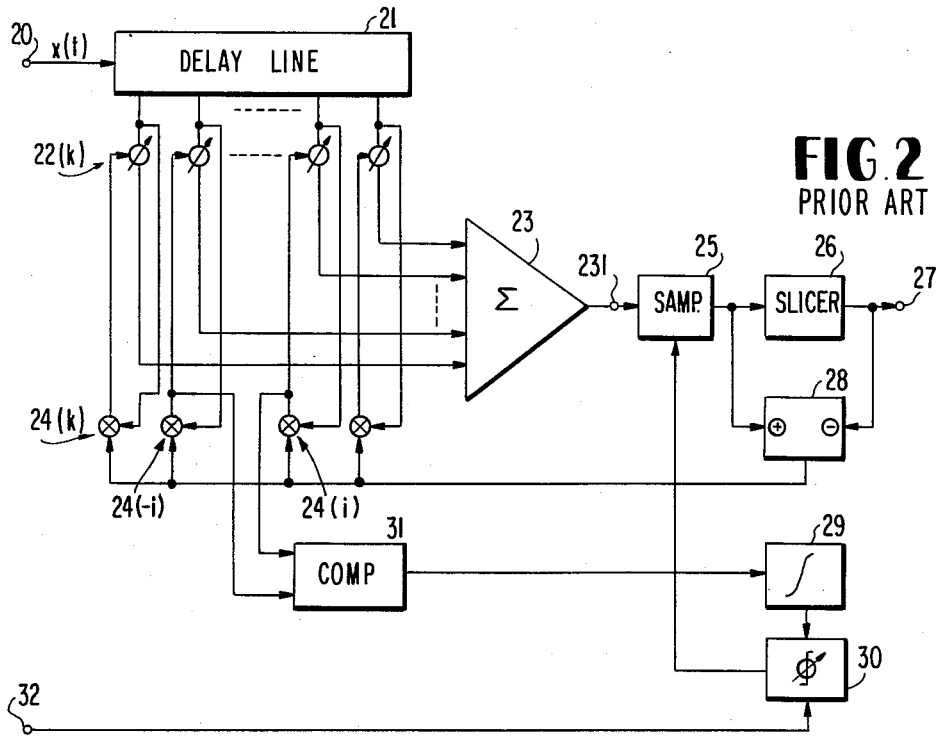
FIG. 2 (discussed above) is a block diagram of an automatic equalizer known in the prior art.
Figure 3:
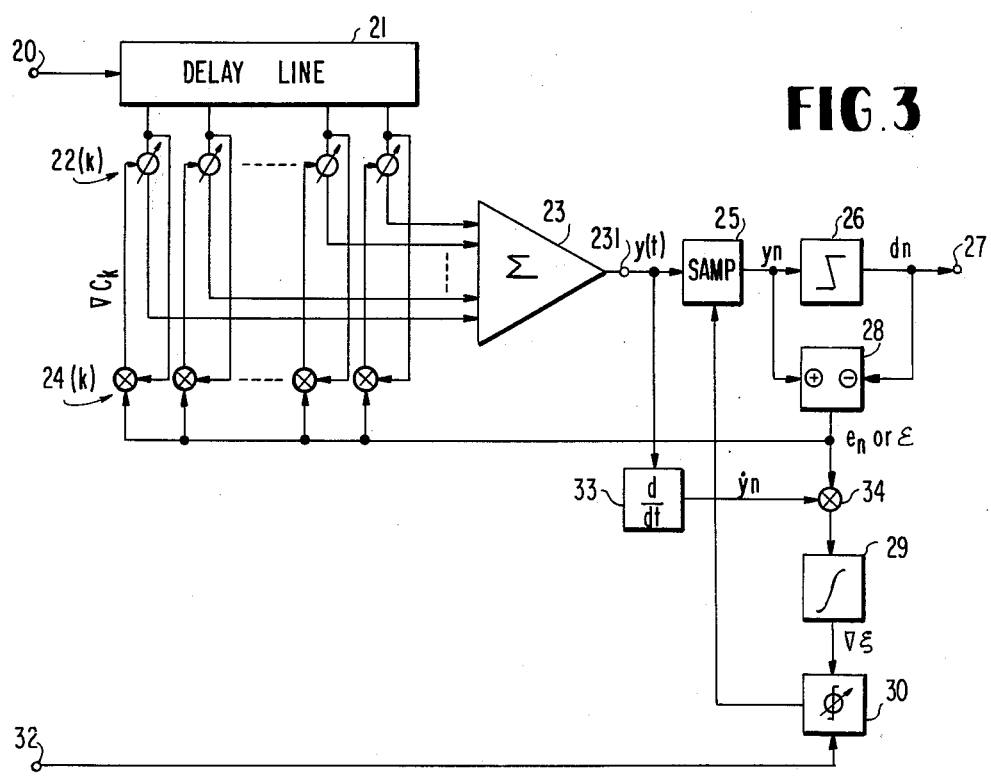
FIG. 3 is a block diagram showing one embodiment of a transversal type automatic equalizer according to the present invention.

The aforementioned mathematically analyzed principle for controlling the automatic equalizer brings about the circuit arrangement as shown in FIG. 3. Instead of the comparator 31 of FIG. 2, a differentiator 33 and a multiplier 34 are provided. The equalized multilevel (PAM) signal appearing at the terminal 231 is differentiated in the differentiator 33, and is fed to the multiplier 34. The multiplier 34 multiplies the error signal by the differentiated signal, and sends the product to an integrator 29. The integrated output signal is fed to a phase shifter 30 as a control signal for controlling the phase of the identifying timing signal. The correspondence between the mathematically analyzed symbols and the signal appearing points in FIG. 3 is as follows:

| Symbols | Signals appearing at |
| --- | --- |
| $x_n$ | tapped delay line 21 output |
| $y(t)$ | terminal 231 |
| $d_n$ | terminal 27 |
| $e_n$ or $\epsilon$ | comparator 28 output |
| $\dot{y}_n$ | differentiator 33 output |
| $\nabla\xi$ | integrator 29 output |
| $\nabla C_k$ | multiplier 24(k) output |

A modified equalizer will be described hereunder, in which the analog type multiplier in FIG. 3 can be simplified without changing the principle of the automatic equalizer. As one method for simplifying an analog type multiplier is known in which analog signals to be multiplied are quantized into digital signals and a digital multiplier is used. The precision of multiplication upon employing this digital type of multiplier depends upon whether the quantization is made finely or coarsely. If it is made finely, then the precision of multiplication is enhanced but the multiplication speed becomes slow, while on the contrary, if it is made coarsely, then the precision of multiplication is degraded but the multiplication becomes fast. In addition, fine qunatization requires more complex circuitry than coarse quantization. The simplest digital multiplier which may replace the analog multiplier of FIG. 3 is a multiplier for a pair of 1-bit digital input signals. In the modified equalizer, two levels of the 1-bit digital signal are made to correspond to the positive and negative polarities of the differentiated signal of the equalized multilevel (PAM) signal and the error signal. The multiplication of the differentiated signal can then be accomplished by means of an exclusive OR circuit.

Figure 4:
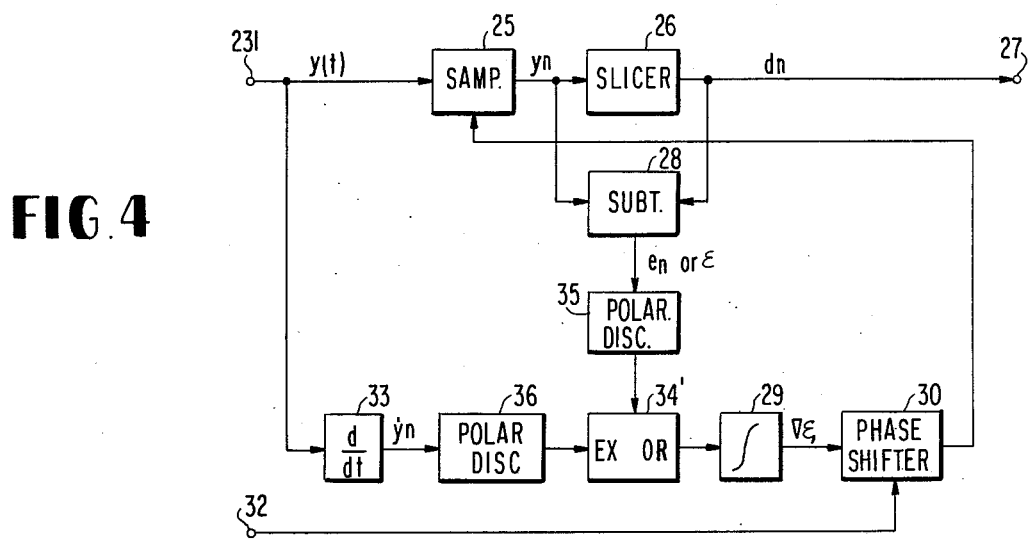
FIG. 4 shows another embodiment according to the present invention which is more simplified than FIG. 3.

This is more easily understood by referring FIG. 4, wherein the error signal derived from the subtractor 28 is sent to a polarity discriminator 35 which delivers a 1-bit digital signal depending upon the polarity of the error signal. On the other hand, differentiator 33 sends the differentiated signal of an equalized multilevel (PAM) signal to a polarity discriminator 36 which delivers a 1-bit digital signal depending upon the polarity of the differentiated signal. It will be appreciated by those skilled in the art that polarity discriminators 35 and 36 can be considered to perform an analog to digital conversion of the error signal and differentiated signal, respectively. OR gate 34' generates an exclusive logical sum of the 1-bit digital signals supplied from the polarity discriminators 35 and 36, and feeds it to the integrator 29. If, for example, the polarity discriminators 35 and 36 in FIG. 4 have positive outputs when their inputs are negative and negative outputs when their inputs are positive, the output of exclusive OR circuit 34' will, for all cases have the same sign as the output of the analog multiplier 34 in FIG. 3. The remaining operations are the same as those in the case of the circuit arrangement in FIG. 3. By continuously carrying out the aforementioned operations in a closed loop in conjunction with the transversal type MSE automatic equalizer, the identifying timing phase is controlled so as to achieve an optimum equalization automatically.

FIG. 5 shows experimental data obtained when a zero-forcing automatic equalizer having 21 delay taps ($k=21$) was used to equalize an 8-level PAM signal having $f_o = 530.75$ khz. The first column shows case number. The fourth column lists the phase ranges which can be equalized by the automatic equalizer of FIG. 3 under various conditions of input distortions. The distortions are given by three serially connected low pass filters whose cut-off frequencies are shown in the second column, and which are connected to the input terminal 20 of FIG. 3 (or FIG. 2). The third and fifth columns show the finally equalized phases by the equalizers of FIGS. 3 and 2, respectively, with reference to the phase of the timing signal supplied from the phase shifter 30 under the case number 0. The X-marks in the fifth column mean that the equalizer FIG. 2 cannot equalize the given deviations.

Figure 1:
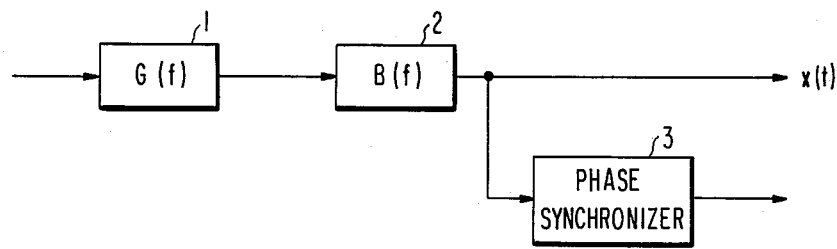
FIG. 1 (discussed above) is a block diagram representing a transmission lines.
Figure 6A:
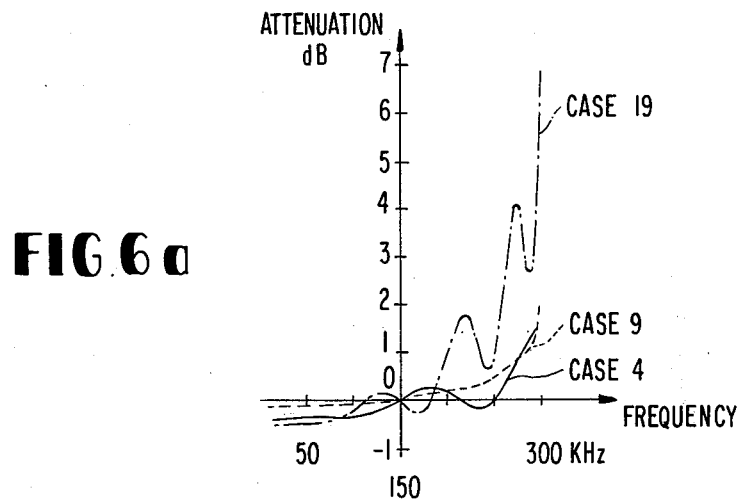
FIGS. 6a and 6b shows examples of experimental attenuation and delay characteristics of the transmission line.
Figure 6B:
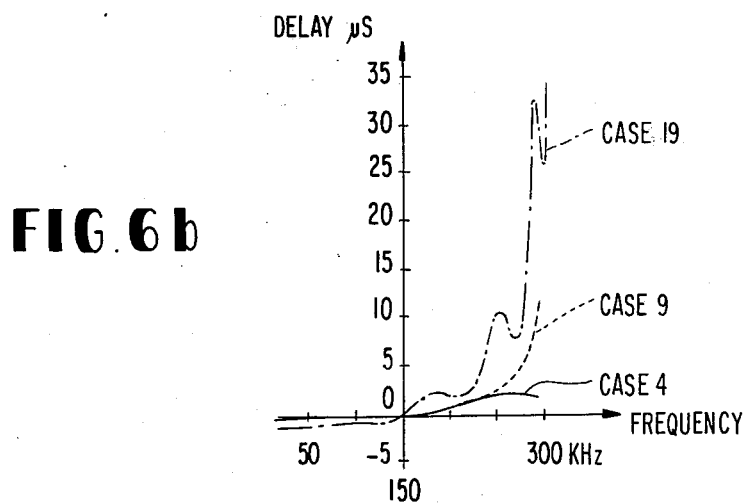

FIGS. 6a and 6b show examples of the attenuation and delay distortions, respectively, given by the low pass filters in the case numbers 4, 9 and 19. It will be understood that for a baud rate of $f_o = 1/T$ the relationship $T = 1/(2W)$ or $W = f_o/2$ is true where W is the bandwidth of the baseband signal. Since the roll-off ratio of the filter 1 in FIG. 1 is 10%, the necessary bandwidth in FIGS. 6a and 6b for $f_o = 530.75$ KHz is (1 + 0.1) × 530.75 × ($\frac{1}{2}$) ≃ 292 KHz.

So far the present invention has been described in connection with only one transversal type automatic equalizer. However, if a transmission path distortion is not extremely large, and if the automatic phase control system according to the present invention is operated in conjunction with a transversal type of automatic equalizer having another algorithm, the direction of phase control will be the same, even though the absolute value of the phase control amount would be different. For example, the present invention could be applied to a transversal type of zero-forcing automatic equalizer.

The advantages obtained by the present invention are as follows:

1. The present invention not only can accomplish an optimum equalization of the transversal type MSE automatic equalizer, but also can be applied to automatic equalizer of other transversl types;
2. If the simplified automatic equalizer according to the present invention is employed, smaller, less expensive circuits can be used.

What is claimed is:

1. In a transversal type automatic equalizer for automatically equalizing an input multilevel signal, comprising tapped delay means for receiving said input multilevel signal and producing a plurality of delayed outputs, variable tap weighting means for weighting the delayed outputs appearing at the taps of said delay means, coupling means for algebraically summing the outputs of said tap weighting means, sampling means for sampling the output of said coupling means in response to a sampling control signal, identification means connected to receive the output of said sampling means for providing an identified signal as the output of said automatic equalizer, error means for comparing the input and output signals of said identification means to provide an error signal representative of the difference between said input and output signals, and first multiplication means for multiplying said delayed outputs by said error signal in order to provide said tap control signals to said variable tap weighting means; the improvement wherein said transversal type automatic equalizer further comprises:

differentiating means for differentiating the output of said coupling means;
second multiplication means for receiving said error signal and the output of said differentiating means, said multiplication means having an output signal corresponding to the product of said received signals;
integrating means for integrating the output of said second multiplication means; and
control means for providing said sampling control signal to said sampling means in response to the output of said integrating means.

2. A transversal type automatic equalizer according to claim 1 further comprising timing means for providing a timing signal, said control means comprising a variable phase shifter for variably phase shifting said timing signal in response to the output of said integrating means.

3. A transversal type automatic equalizer according to claim 2 wherein said identification means comprises a slicer.

4. A transversal type automatic equalizer according to claim 1, wherein said second multiplication means comprises:

analog to digital conversion means for converting the outputs of said error means and said differentiating means into respective digital signals; and
a digital multiplier for multiplying said digital signals.

5. A transversal type automatic equalizer according to claim 4, further comprising timing means for providing a timing signal and wherein said control means is a variable phase shifter for phase shifting said timing signal in response to the output from said integrating means.

6. A transversal type automatic equalizer according to claim 5, wherein said analog to digital conversion means comprises first and second polarity discriminators for receiving the outputs from said error means and said differentiating means, respectively, said polarity discriminators having binary output signals corresponding to the polarities of their respective input signals, said digital multiplier comprising an exclusive OR gate.

* * * * *

UNITED STATES PATENT AND TRADEMARK OFFICE
CERTIFICATE OF CORRECTION

PATENT NO. : 4,071,827
DATED : January 31, 1978
INVENTOR(S) : Shin'ichi KOIKE et al It is certified that error appears in the above-identified patent and that said Letters Patent are hereby corrected as shown below:

IN THE SPECIFICATION:

Column 1, line 28 - delete Equation (1) and insert --
$$X(f) = G(f) \cdot B(f) \cdot e^{j2\pi f \tau}$$

line 56 - delete Equation (5) and insert --
$$X(f) = G(f) \cdot B(f) \cdot e^{j2\pi f_s \tau}$$

line 58 - delete "made"

line 67 - delete "$(-Nt < k < Nt$" and insert --
-- $(-Nt \leq k \leq Nt$ --

Column 4, line 20 - delete "shows" insert -- show --

Column 6, line 4 - delete "equalizer" insert -- equalizers -- line 4 delete "transversl" insert -- transversal --

Signed and Sealed this

Thirtieth Day of May 1978

[SEAL]

Attest:

RUTH C. MASON
Attesting Officer

LUTRELLE F. PARKER
Acting Commissioner of Patents and Trademarks